(12) United States Patent
Lam

(10) Patent No.: US 9,680,654 B2
(45) Date of Patent: *Jun. 13, 2017

(54) SYSTEMS AND METHODS FOR VALIDATED SECURE DATA ACCESS BASED ON AN ENDORSEMENT PROVIDED BY A TRUSTED THIRD PARTY

(71) Applicant: Lockbox LLC, Redmond, WA (US)

(72) Inventor: Kevin Lam, Redmond, WA (US)

(73) Assignee: Lockbox LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,754

(22) Filed: Jun. 8, 2015

(65) Prior Publication Data

US 2015/0381370 A1    Dec. 31, 2015

Related U.S. Application Data

(63) Continuation of application No. 13/901,401, filed on May 23, 2013, now Pat. No. 9,053,329.

(60) Provisional application No. 61/651,188, filed on May 24, 2012.

(51) Int. Cl.
| | |
|---|---|
| *H04L 9/32* | (2006.01) |
| *G06F 21/60* | (2013.01) |
| *G06F 21/62* | (2013.01) |
| *H04L 29/08* | (2006.01) |
| *G06F 17/30* | (2006.01) |
| *H04L 29/06* | (2006.01) |

(52) U.S. Cl.
CPC ...... *H04L 9/3249* (2013.01); *G06F 17/30197* (2013.01); *G06F 21/60* (2013.01); *G06F 21/6218* (2013.01); *H04L 63/0823* (2013.01); *H04L 63/105* (2013.01); *H04L 67/1097* (2013.01); *G06F 2221/2111* (2013.01); *G06F 2221/2115* (2013.01); *H04L 63/10* (2013.01); *H04L 63/107* (2013.01); *H04L 2209/24* (2013.01); *H04L 2209/72* (2013.01)

(58) Field of Classification Search
CPC ... G06F 21/60; G06F 21/6245; H04L 63/1433
USPC .......................................................... 713/176
See application file for complete search history.

(56) References Cited

U.S. PATENT DOCUMENTS

| | | | |
|---|---|---|---|
| 7,486,943 B2 | 2/2009 | Choti et al. | |
| 8,544,070 B2 * | 9/2013 | Mukkara ............... | H04L 9/0894 380/247 |
| 9,053,329 B2 * | 6/2015 | Lam ....................... | G06F 21/60 |

(Continued)

*Primary Examiner* — Hadi Armouche
*Assistant Examiner* — Bryan Wright
(74) *Attorney, Agent, or Firm* — Lowe Graham Jones PLLC; Benedict R. Dugan

(57) ABSTRACT

Methods, systems, and techniques for securing access to stored data are provided. Example embodiments provide a Storage Management System ("SMS") that is configured to facilitate protected information sharing. The SMS may restrict access to shared information based on one or more criteria that validate an entity's right to access the information. For example, the SMS may restrict access to entities that are located in a particular geographic region, that are using a particular type of hardware or software, that hold particular credentials, or the like. In some cases, the SMS may require that an entity's claim to meet on or more required criteria be validated by a trusted third party.

19 Claims, 13 Drawing Sheets

(56) References Cited

U.S. PATENT DOCUMENTS

| | | | |
|---|---|---|---|
| 2004/0153908 A1* | 8/2004 | Schiavone | G06F 21/6245 714/712 |
| 2005/0033991 A1* | 2/2005 | Crane | H04L 63/1433 726/4 |
| 2005/0132202 A1* | 6/2005 | Dillaway | H04L 9/0825 713/179 |
| 2007/0079136 A1 | 4/2007 | Vishik et al. | |
| 2007/0299852 A1* | 12/2007 | Miyata | G06Q 10/10 |
| 2008/0127310 A1 | 5/2008 | Robbins et al. | |
| 2009/0063289 A1* | 3/2009 | Byrd | G06Q 30/0601 705/26.1 |
| 2009/0172783 A1* | 7/2009 | Eberstadt | G06Q 10/107 726/4 |
| 2010/0050233 A1* | 2/2010 | Ross | G06F 21/33 726/2 |
| 2011/0010421 A1* | 1/2011 | Chavez | H04L 12/6418 709/204 |
| 2011/0116493 A1* | 5/2011 | Caceres | H04L 12/66 370/352 |
| 2011/0173676 A1 | 7/2011 | Peckover | |
| 2011/0321147 A1* | 12/2011 | Chakra | G06F 21/6218 726/9 |
| 2012/0016999 A1* | 1/2012 | Kieselbach | G06F 17/30607 709/229 |
| 2012/0222083 A1 | 8/2012 | Vaha-Sipila et al. | |

* cited by examiner

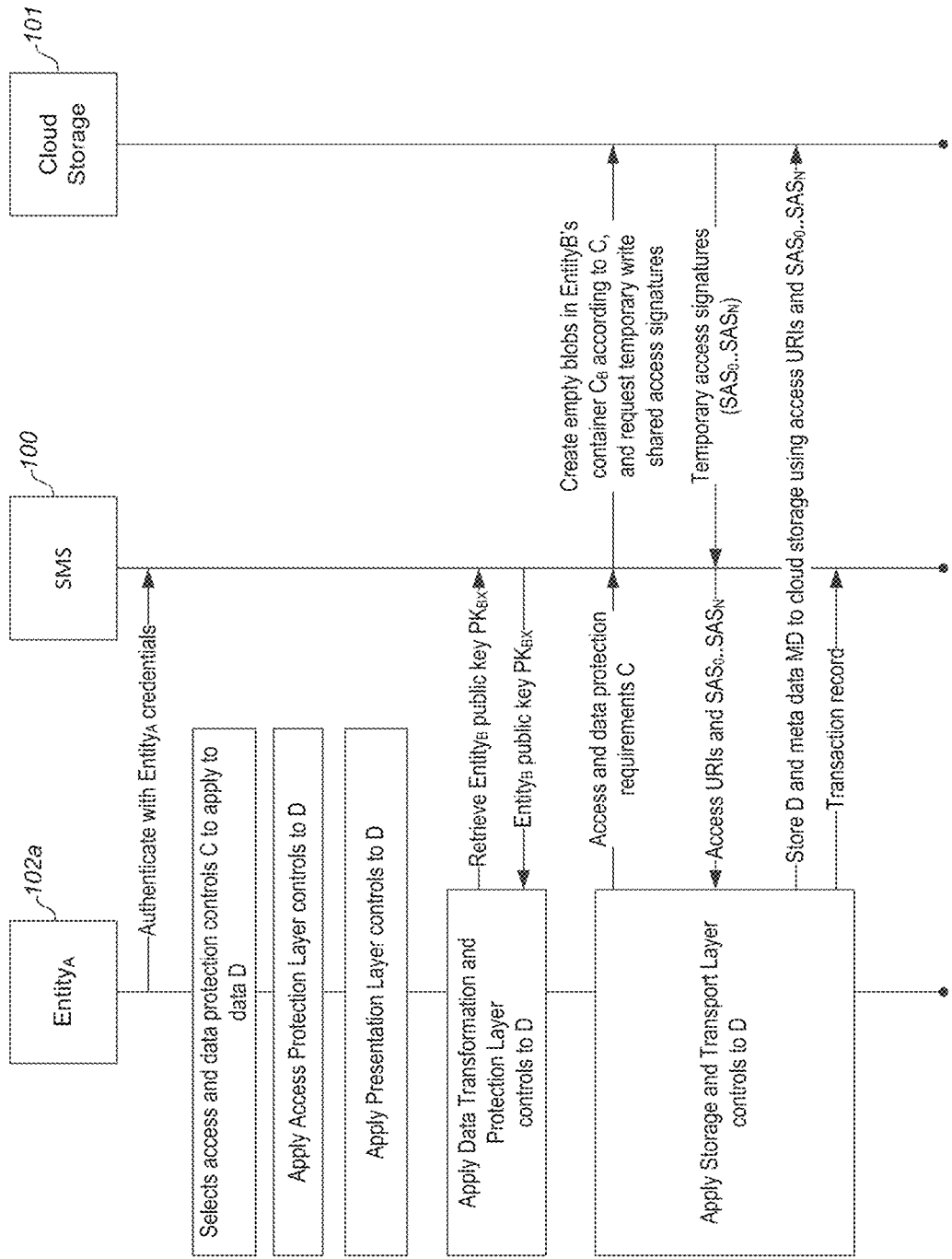

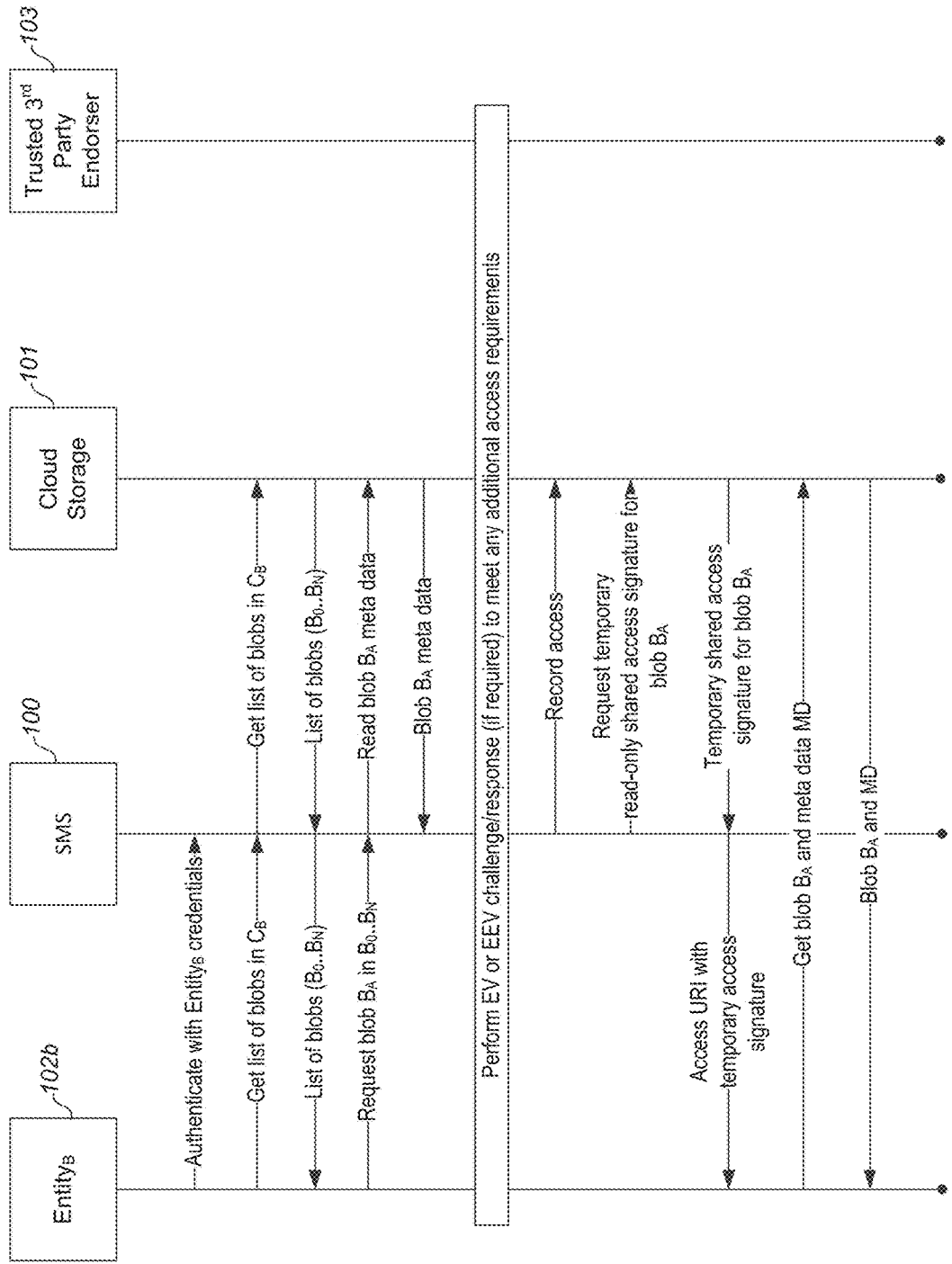

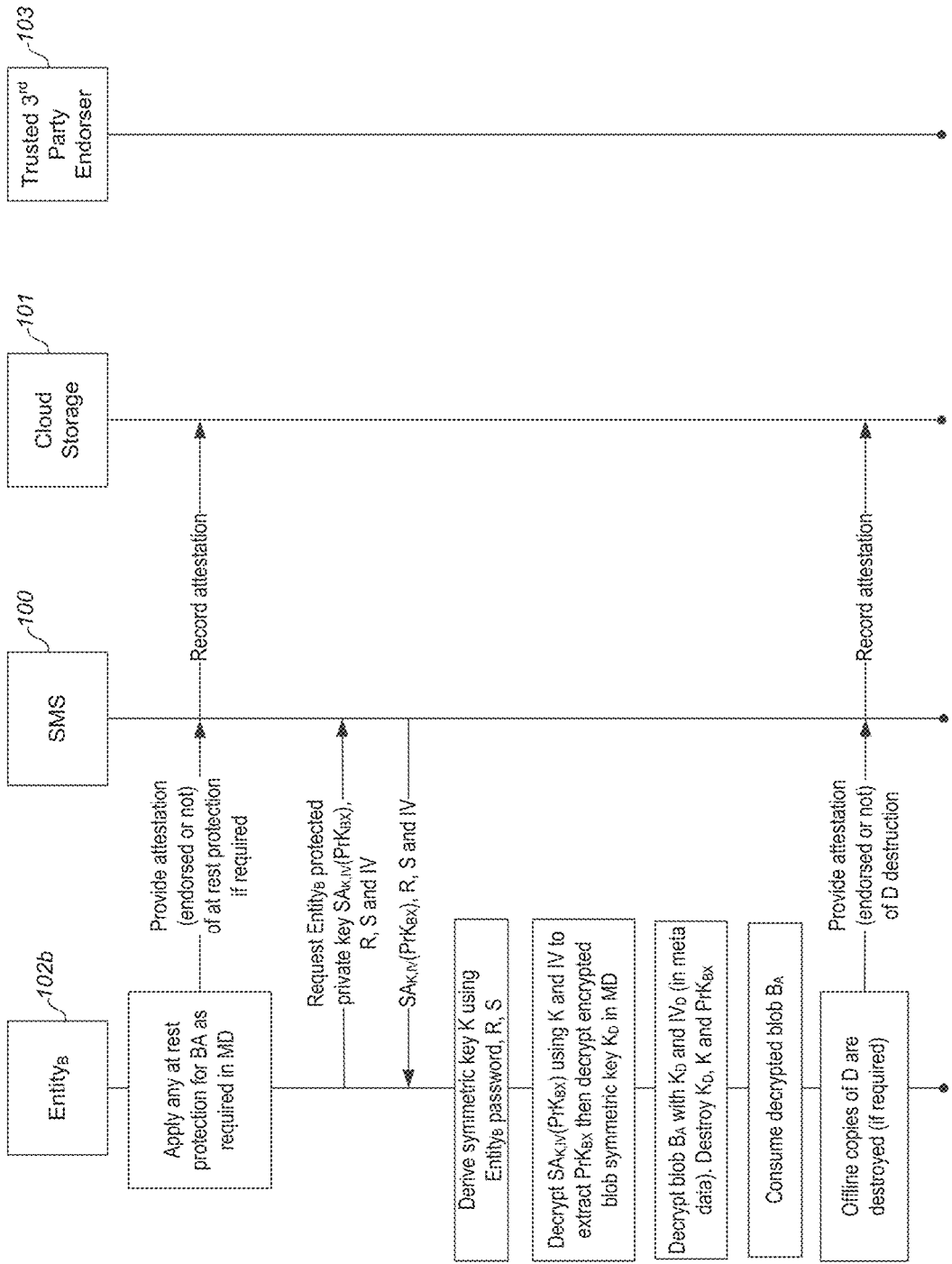

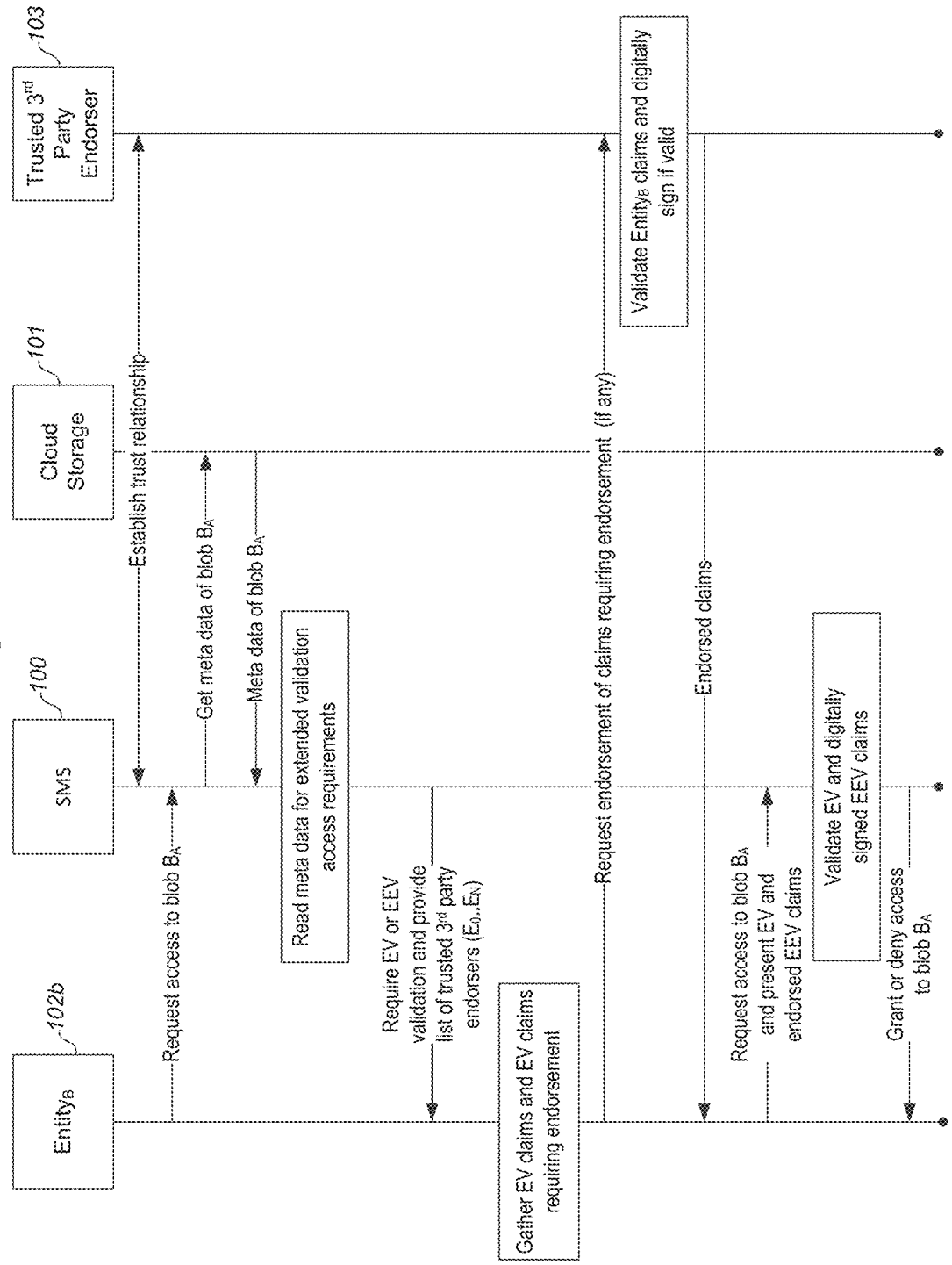

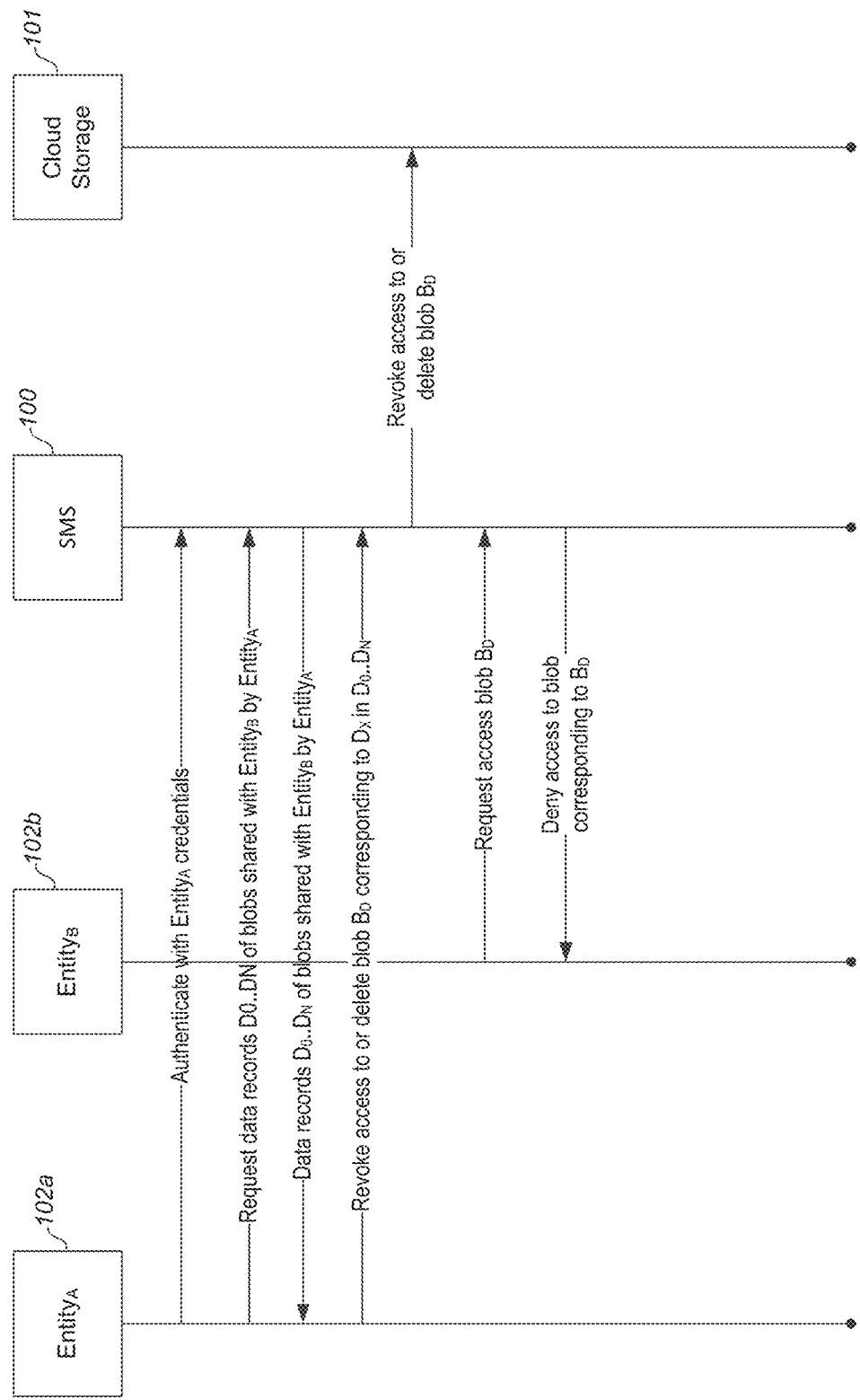

Fig. 7.1
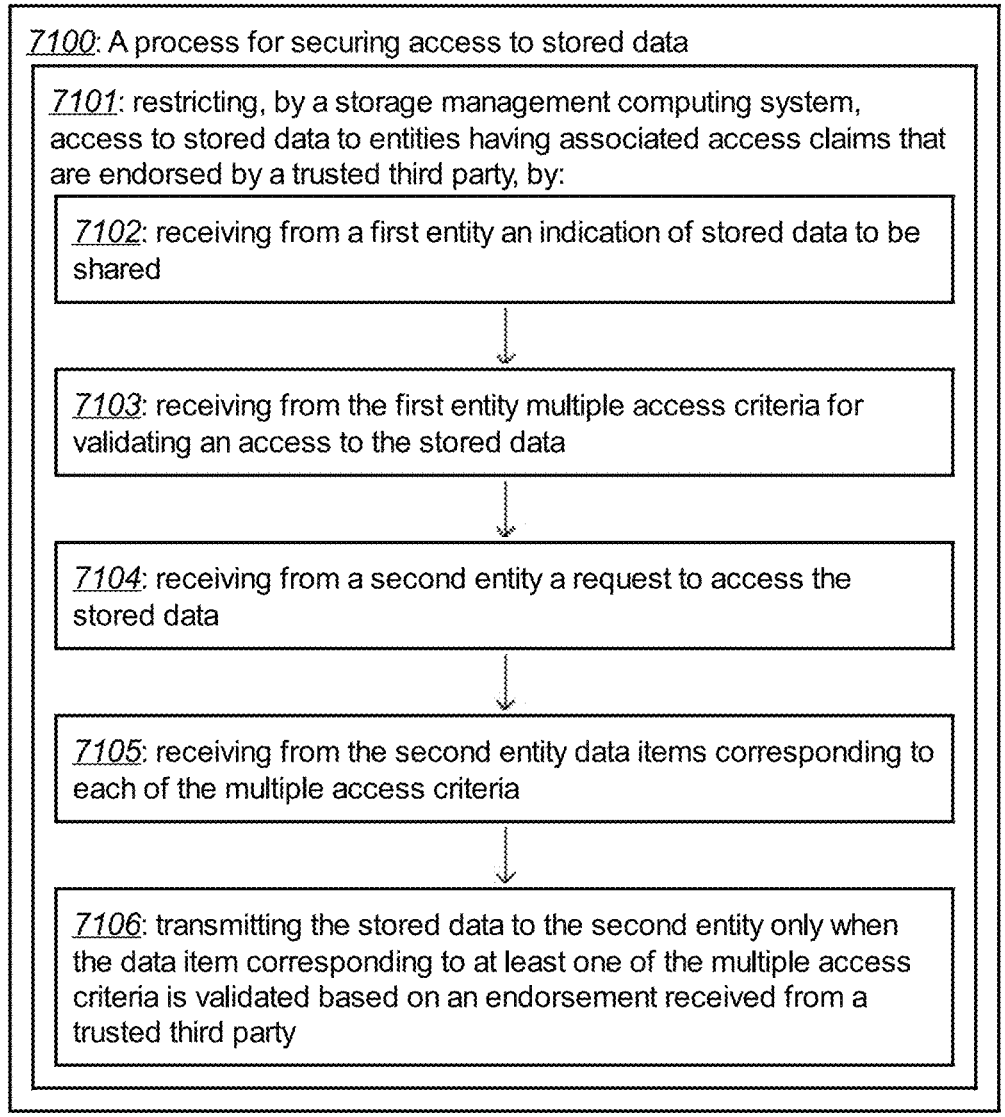
Fig. 7.2
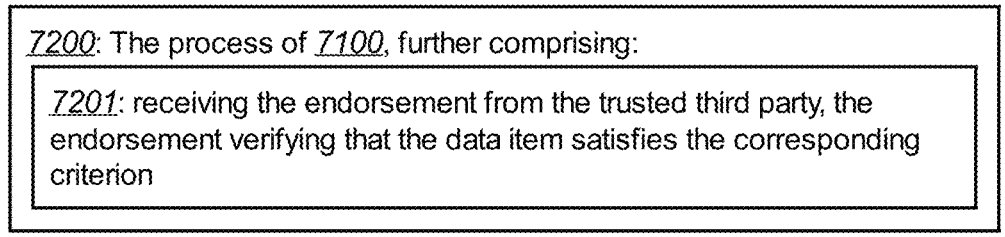

Fig. 7.3

*7300*: The process of *7100*, further comprising:

*7301*: causing the second entity to obtain the endorsement from the trusted third party, by:

*7302*: transmitting to the second entity the multiple access criteria along with an indication of the trusted third party

*7303*: receiving from the second entity an indication that one of the data items has been endorsed by the trusted third party

Fig. 7.4

*7400*: The process of *7100*, wherein the multiple access criteria include associated weights, and further comprising:

*7401*: determining a score based on an aggregation of the weights applied to indications of whether each of the multiple access criteria have been met by the second entity, wherein a first one of the multiple access criteria requires the second entity to make an attestation regarding compliance with a local storage requirement, the first multiple access criteria not requiring an endorsement from the trusted third party, wherein a second one of the multiple access criteria requires an endorsement from the trusted third party

*7402*: transmitting the stored data only when the determined score is higher than or equal to a specified threshold

Fig. 7.5

*7500*: The process of *7100*, wherein the receiving from the first entity multiple access criteria includes:

> *7501*: receiving an access criterion that requires an entity to be or reside at a specified location

Fig. 7.6

*7600*: The process of *7100*, wherein the receiving from the first entity multiple access criteria includes:

> *7601*: receiving an access criterion that requires an entity to authenticate themselves using a password, symmetric key, X.509 certificate, and/or a one-time password provided by a hardware or software token generator

Fig. 7.7

*7700*: The process of *7100*, wherein the receiving from the first entity multiple access criteria includes:

> *7701*: receiving an access criterion that requires an entity to be accessing the stored data from a computer having specified system properties

Fig. 7.8

7800: The process of 7100, wherein the transmitting the stored data to the second entity only when the data item corresponding to at least one of the multiple access criteria is validated includes transmitting the stored data only when the trusted third party verifies that the second entity is accessing the stored data from a computer associated with an organization that is certified as complying with one or more of a security standard, a privacy regulation, or a quality standard

Fig. 7.9

7900: The process of 7100, further comprising:

7901: establishing a trusted relationship with the trusted third party by sharing a secret with the trusted third party

7902: receiving from the second entity an indication that one of the data items has been endorsed by the trusted third party, the indication including a digital signature generated by the trusted third party using the shared secret

7903: validating the digital signature generated by the trusted third party

SYSTEMS AND METHODS FOR VALIDATED SECURE DATA ACCESS BASED ON AN ENDORSEMENT PROVIDED BY A TRUSTED THIRD PARTY

PRIORITY CLAIM

This application is a continuation of U.S. patent application Ser. No. 13/901,401, entitled "Systems and Methods For Validated Secure Data Access," filed May 23, 2013, which claims the benefit of U.S. Provisional Patent Application No. 61/651,188, entitled "Systems and Methods For Validated Secure Data Access," filed May 24, 2012, the contents of which are incorporated herein by reference in their entireties.

TECHNICAL FIELD

The present disclosure relates to methods, techniques, and systems for managing and securing access to stored data and, in particular, to methods, techniques, and systems for validating access criteria based on endorsements received from trusted third parties.

BACKGROUND

Traditional approaches for protecting data use a combination of passwords and/or encryption algorithms. These techniques yield several limitations which increase overall risk to data owners. One of these limitations is that data owners cannot enforce data access requirements based on the context with which data is being accessed, such as, but not limited to where the data is being accessed, on what system the data is being accessed and what controls exists on that system to protect that data access. Another limitation is that password and/or encryption keys may be easily guessed or stolen by malicious hackers if the selected password or encryption key is weak.

A further limitation relates to the management of copied information. For example, when the owner of sensitive information ("Data Owner" or DO) shares that information with a primary business or person ("Primary Data Accessor" or $DA_P$) a copy of that data is created and given to the $DA_P$. If the $DA_P$ does not maintain sufficient risk mitigating controls on that information copy, the DO and $DA_p$ are exposed to risks such as, but not limited to, data breach, data loss or identity theft. The $DA_P$ may be further exposed to fines or penalties from federal regulations (e.g., HIPAA, HITECH, etc.), standards or state laws. If the $DA_P$ shares that information copy with another data accessor or a series of data accessors, such as internal employees, vendors or contractors ("Extended Data Accessor" or $DA_E$) and sufficient risk mitigating controls are not maintained by the $DA_E$ further exposure to risk is created.

The following are some example data breaches. In 2006, the US Department of Veterans Affairs ($DA_p$) lost the personal information of up to 26.5 million veterans (DO). In this case, an employee ($DA_E$) took home unencrypted electronic data containing the personal information which was later stolen from the home of that employee. In another case, in 2007, a reported 94 million credit card accounts (DO) were lost by TJX Cos ($DA_P$). The data loss was believed to be due to a hacker attack.

In sum, once the DO has shared sensitive information with a $DA_P$ or $DA_E$ they have limited to no physical/technical control regarding when, where, how and by who that data is accessed. The techniques described below address these limitations and shortcomings.

BRIEF DESCRIPTION OF THE DRAWINGS

FIG. 2 is a flow diagram that illustrates a process for protected information sharing according to one embodiment.

FIGS. 3A and 3B together are a flow diagram that illustrates a process for protected information access according to one embodiment.

FIG. 4 is a flow diagram that illustrates a process for access validation according to one embodiment.

FIG. 5 is a flow diagram that illustrates a process for shared information revocation according to one embodiment.

FIGS. 7.1-7.9 are flow diagrams that illustrate processes for securing access to stored data according to one embodiment.

DETAILED DESCRIPTION

Figure 1:
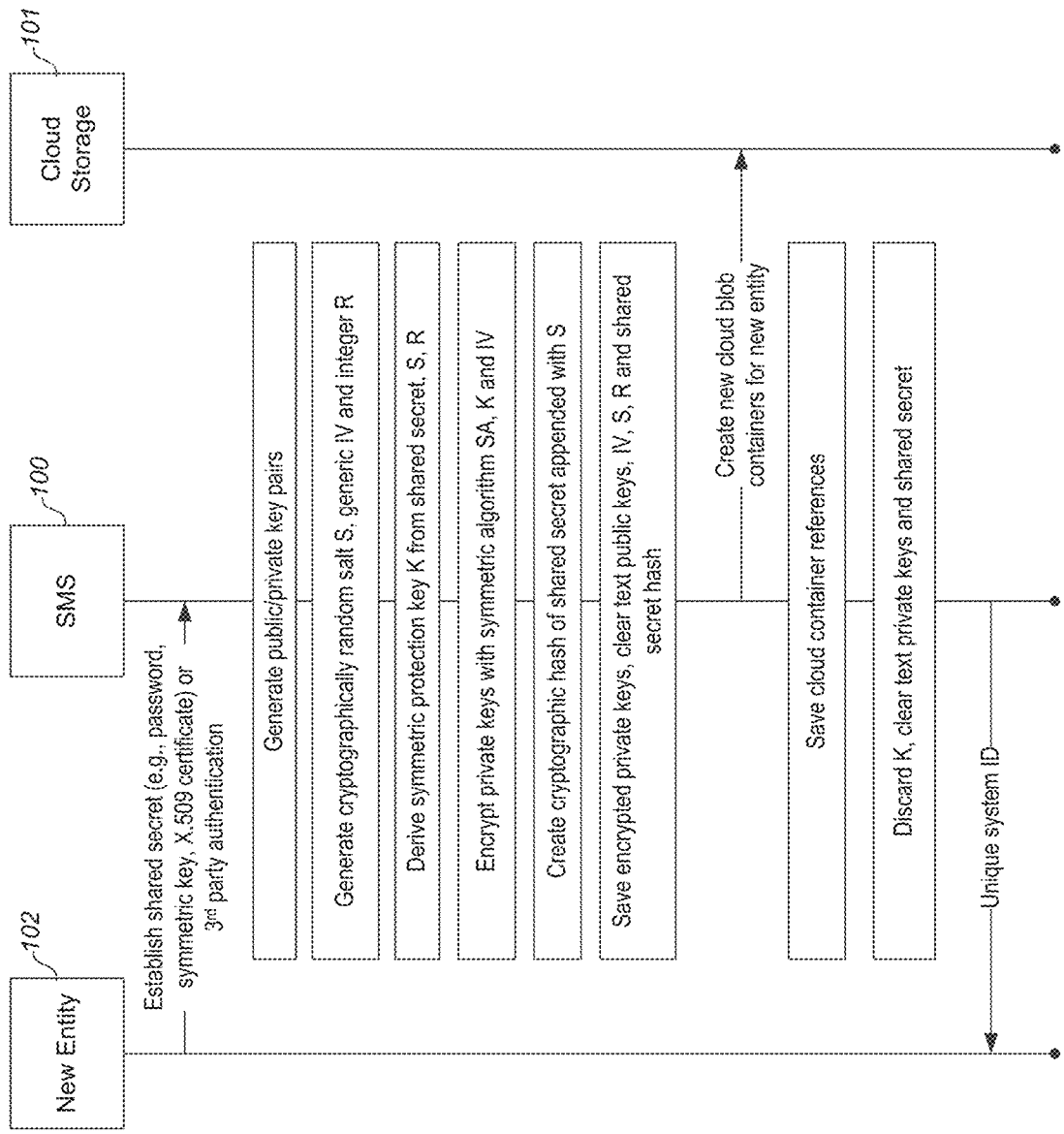
FIG. 1 is a flow diagram that illustrates a process for user account creation according to one embodiment.

Embodiments described herein provide enhanced computer- and network-based methods, techniques, and systems for managing and securing access to stored data. Example embodiments provide a Storage Management System ("SMS" or sometimes, the "System") that is configured to facilitate protected information sharing. The SMS governs and protects access to shared sensitive information.

Some embodiments of the SMS are cloud-based. That is, the SMS operates as a service that is accessible to users operating remote client devices or systems. The SMS itself may rely on cloud-based storage, such that the data managed by the SMS resides in a network-accessible system, possibly operated by some third party. The described techniques are equally applicable in a non-cloud-based embodiment. In particular, the described techniques can be applied in contexts where storage and computing services are not provided as a service to a heterogeneous collection of end-users or entities. For example, the described techniques may be used to secure, control, or otherwise regulate access to data that is stored on private, internally managed computing systems of an organization (e.g., corporation, agency, household).

The described techniques generally relate to controlling data access to shared data. Some embodiments incorporate additional properties or criteria when considering whether to grant or deny access to a particular user, sometimes referred to herein as "extended validation" and/or "extended endorsed validation."

As one example, consider a user's GPS location. The described SMS may grant or deny access to data based on their current location. This ability to grant or deny access based on location may be useful scenarios, such as, but not limited to the following.

As one example, a wife could share intimate photos with her husband, and restrict his ability to view those photos unless he is within X miles of their residence. This would prevent him from showing those photos to friends at the gym, or if his laptop or mobile device got stolen that data would no longer be accessible.

As another example, a movie studio or content provider could sell a digital copy of the Batman movie and license it only for viewing at the user's residence. If the user tried to view that movie at his friend's house, the access would be denied.

As a further example, a laptop computer or other mobile device could be configured to allow access to data only within the United States (or some other country). Thus, if the laptop is stolen and is eventually transported to a foreign (and potentially hostile) nation, the SMS can restrict access to the data.

The techniques can be applied to improve traffic safety. For example, a mobile device manufacturer or mobile operating system vendor, as a means to improve overall road safety, could limit or deny access to data accessible via that device (e.g., text messages, emails, photos, music, etc.) if the GPS location of the device is changing at a rate greater than some pre-defined safe rate.

Also, a company in possession of highly sensitive or proprietary data could restrict access to that data so that it is only accessible from within the geographical location of the company facilities. This would prevent an employee from accessing that same data from say their home or a coffee shop where the potential for a data breach (e.g., lost, stolen or misplaced laptop) is higher.

Location is but one aspect with which the SMS can control access to data. For example, the SMS may also or instead require that, in order to access particular data, the user's computer must have particular characteristics, such as that the computer is running antivirus software on his computer and that the software must be up to date.

Some embodiments utilize a technique sometimes referred to herein as "extended endorsed validation," which relies on a trusted third party to endorse a claim made by a user. For example, a user may lie or be mistaken about their location or other required information (e.g., software version). To account for such inaccuracies, a trusted third party may be used to vouch for the claim made by the user. For example, if the SMS requires that the user must be in Washington state to access data, the system may use Facebook (or some other social network) as the trusted third party to validate the user's claims that they reside in Washington state before granting access to data. Other types of trusted third parties include network providers (e.g., for identity and location information), government agencies (e.g., for identity, residence, or immigration status), financial services (e.g., for financial history, residence information, credit information), and the like. In general, a trusted third party is an entity or system that is independent of the SMS and the entities that are sharing/accessing data. The trusted third party is typically not owned, funded, operated, or otherwise related with the SMS or the entities involved with the transaction. While the trusted third party is typically impartial, this does not mean that it cannot charge a fee for providing its services, such as in the manner of a notary public.

Process for User or Entity Account Creation

FIG. 1 is a flow diagram that illustrates a process for user account creation according to one embodiment. FIG. 1 depicts interactions between an SMS 100, a cloud storage system 101, and an entity 102. The interactions result in the creation of a user account associated with the entity 102.

When the entity 102 (e.g., a user or application) is registered onto the SMS 100 the following actions are performed. All communications between entities and the SMS 100 are conducted over a protected communication channel, such as, but not limited to SSL.

First, the entity 102 is registered with the SMS 100 using a shared secret, such as, but not limited to, a password. For each entity 102 registered with the SMS 100, a series of private and public key pairs, using the Rivest Shamir Adleman (RSA) or another asymmetric key algorithm is generated. The key pair sizes generated can be 1024-bit, 2048-bit, 3072-bit or 16384-bit or some other custom level of encryption. The private and public key pairs will be referred to as $PrK_X$ and $PK_X$, respectively, where X denotes the strength of the private/public key pair. For example, $PrK_{1024}$ would indicate a private key of strength 1024 bits.

A cryptographically random salt value ("S"), generic initialization vector ("IV") and random integer value ("R") is generated, recorded and associated to the entity 102 by the SMS 100.

Next, each entity private key is protected using a symmetric encryption key ("K") of strength X. K may be derived using a standard key derivation algorithm such as PBKDF2, scrypt, etc., using S as the salt value, and R as the key derivation iterations and the entity shared secret. Each entity private key of strength N is encrypted with a selected symmetric algorithm ("SA"), using K of strength X and initialization vector IV to produce $SA_{X,K,IV}(PrK_N)$. $SA_{X,K,IV}(PrK_N)$ is stored by the SMS 100 and associated with the proper entity 102. This process of encrypting the private key is advantageous because it helps ensure that only those entities that know the entity shared secret, S and R can access data encrypted with the corresponding public key. It creates a higher degree of privacy for users and alleviates common concerns regarding unauthorized data access, especially in, but not limited to, cloud-based scenarios.

Then, a cryptographic hash ("H") of the shared secret with S is generated and stored by the SMS 100. The hash algorithm can be any cryptographically hash algorithm, such as, but not limited to MD5, SHA1, SHA256, SHA384 and SHA512. H is used by each entity in the future to authenticate themselves with the SMS 100. The clear-text copy of the shared secret is discarded and not recorded by the SMS 100.

At the cloud storage system 101, a cloud-based storage container, or series of containers/buckets, is created for the entity 102. $C_X$ will be used to refer to a container that belongs to entity X. For example, $C_A$ would be used to refer to the storage container or containers that belongs to entity A.

The SMS 100 saves a record of the entity containers. K, all clear text private keys, and all clear text instances of the shared entity secret are then securely discarded by the SMS 100. Each entity is given a unique ID that distinguishes themselves from other entities registered with the SMS 100

Process for Information Sharing and Protection

FIG. 2 is a flow diagram that illustrates a process for protected information sharing according to one embodiment. FIG. 2 depicts interactions between the SMS 100, the cloud storage system 101, and an entity 102a. The interactions result in storage of information provided by an entity 102a for sharing with another entity. FIGS. 3A and 3B, below, depict protected information access to the shared information by the other entity.

The following describes the process of entity A ($Entity_A$) 102a sharing information, D, with entity B ($Entity_B$) using the SMS 100. All communications between $Entity_A$ 102a and the SMS 100 are conducted over a protected communication channel, such as, but not limited to SSL.

First, Entity$_A$ validates itself with the SMS 100 using, for example, a password. Then, Entity$_A$ selects a set of data access and protection controls, C, to apply to the copy of D that will be shared with Entity$_B$. The set of data controls in C dictate, but are not limited to, how data is accessed and stored by Entity$_B$, restrictions enforced by third-party applications used to process or protect D, how D is protected at rest, how and where D is stored and how D is protected in transit. Custom instances of C can be created to align with the rules and requirements of various regulations, standards or organizational data protection policies. For example, C$_{HIPAA}$ could define a set of data protection and access controls that align with the rules and requirements of the Health Insurance Portability and Accountability Act (HIPAA). C may be expressed in a format such as, but not limited to, string-based dictionaries, XML or JSON.

Figure 6A:
FIG. 6A is a block diagram that illustrates a protection stack according to one embodiment.

D and C are used as inputs into a data protection stack or pipeline which logically can be represented as shown in FIG. 6A. Each layer may read C and apply the appropriate controls to D. Information about data access criteria, storage criteria, transformations and other controls required by C are recorded in a metadata (MD) structure at each layer and passed to the layer below it. The MD structure can also store other information about D, such as MD5 or SHA1 hash values. The MD structure can be a dictionary with string keys and values. Other structures or formats, such as, but not limited to, XML or JSON can also be used. The MD and protected version of D are outputs from the data protection stack.

Access Protection Layer:

This layer reads C to determine the requirements (R) that Entity$_B$ must meet in order to access D. See section titled "Access Validation: Basic Validation, Extended Validation and Endorsed Extended Validation" and FIG. 4 for the process of access validation utilized by the SMS 100. C may specify no, single, or multiple access requirements (R$_0$ ... R$_N$). Furthermore, C may assign a weight (W) to each requirement, W(R$_N$), whereby Entity$_B$ may access D after a certain number of requirements are met that produces a cumulative weight that is deemed acceptable by C for granting Entity$_B$ access to D. C may require that when Entity$_B$ presents proof to meet data access requirements, such as, but not limited to, current longitude and latitude, that proof is validated by a third party or series of third parties which are trusted by the SMS 100. More information about this process of presenting validated proof is presented in the section titled "Access Validation: Basic Validation, Extended Validation and Endorsed Extended Validation" and FIG. 4. Finally, C may specify how data should be accessed and stored by Entity$_B$. For example, C may require Entity$_B$ to store local copies of D using an encrypted file system. Or, C may require Entity$_B$ to only access D online and is not permitted to save a local copy after use. More information about access and storage requirements are presented in the section below titled "Local Access and Local Storage Restrictions."

Presentation Protection Layer:

This layer reads C to determine the controls to apply that are enforced by third-party applications that consume D. Example controls include, but are not limited to: applying a permanent digital water mark to D, where D is a digital image; applying a read-only password to D, where D is a business document, such as a Microsoft® Word, Excel®, PowerPoint®, Access® document; applying a read-only password to D, where D is a Portable Document Format (PDF) document; applying a password to a PDF document that helps prevents the printing of that PDF; and the like Data Transformation and Protection Layer:

This layer reads C to determine the controls to apply to protect the data of D. Typical transformations and protections applied are, but not limited to, data compression and encryption. If C requires D to be compressed, this layer will compress D using a compression algorithm specified by C, such as, but not limited to GZip and Deflate. Any other transformation operations are performed on D as required by C. If D is required to be encrypted by C, this layer will request from the SMS 100 Entity$_B$'s public key PK$_{BX}$ where X represents the strength of the public key as required by C. A random symmetric encryption key ("K$_D$"), and initialization vector ("IV$_D$"), of strength X$_D$ is generated using symmetric algorithm ("SA") as required by C, such as, but not limited to Advanced Encryption Standard (AES). X$_D$ can be symmetric key strengths, such as 128-bit or 256-bit. D will be encrypted with SA using K$_D$ and IV$_D$ to generate SA$_{K,IV}$(D). K$_D$ will be encrypted with Entity$_B$'s public key PK$_{BX}$ to produce PK$_{BX}$(K$_D$). SA, PK$_{BX}$(K$_D$), IV$_D$, X, and X$_D$ will be saved within MD with a predefined metadata key. If data encryption of D is required by C, then for the remainder of this document D will be used to refer to SA$_{K,IV}$(D). K$_D$ is discarded/destroyed after use.

Storage and Transport Protection Layer:

This layer reads C to determine the controls to apply to protect D as it relates to the secure transport and storage of D. This layer sends C to the SMS 100. The SMS 100 interprets any storage requirements and will create empty blobs inside Entity$_B$'s cloud container C$_B$ that meet those requirements. For example, if C specifies that D must be stored in the United States, then the SMS 100 will create a series of private empty blobs storage endpoints that are known to exist in the United States.

The SMS 100 will then return a set of access information/data, such as but not limited to, Uniform Resource Identifiers (URIs) with shared access signatures (SAS$_0$ ... SAS$_N$, where N is the total number of URIs returned). The URIs with the access signatures provide the storage protection layer with temporary write-access to the blobs created by the SMS 100. Access is time-bound, for example a signature may be valid only for 20 minutes. The Storage and Transport Protection layer write D and MD to the cloud storage endpoints. The Storage and Transport Protection layer will mark in MD that Entity$_A$ is the owner of D with a predefined metadata key.

Next, a transaction record that captures what storage endpoints used to write D to cloud storage is sent to the SMS 100, and signals the end of the information sharing process. The SMS 100 records this transaction record in a persistent storage structure, such as, but not limited to a database. The D is now ready to be shared and accessed with Entity$_B$.

Process for Protected Information Access

FIGS. 3A and 3B together are a flow diagram that illustrates a process for protected information access according to one embodiment. FIGS. 3A and 3B depict interactions between the SMS 100, the cloud storage system 101, an entity 102b, and a third-party endorser 103. The interactions result in access by the entity 102b to the information shared as described with respect to FIG. 2A.

The following describes the process of entity B (Entity$_B$) 102b accessing the information, D, shared to them by entity A (Entity$_A$) using the SMS 100. All communications between Entity$_B$ and the SMS 100 are conducted over a protected communication channel, such as, but not limited to SSL.

Starting with FIG. 3A, Entity$_B$ validates itself with the SMS 100 using a shared secret that is known to Entity$_B$ and the SMS 100, such as, but not limited to, a password. $\text{Entity}_B$ requests from the SMS 100 a listing of available blobs $(B_0 \ldots B_N)$ shared to them in their cloud storage container $C_B$. A listing of shared blobs $(B_0 \ldots B_N)$ is returned and $\text{Entity}_B$ selects and requests blob $B_A$ in $B_0 \ldots B_N$ which corresponds to the information, D, shared by $\text{Entity}_A$.

The SMS 100 reads the meta data stored for $B_A$ in cloud storage 101 and interprets any access extended validation (EV) or endorsed extended validation (EEV) requirements specified by $\text{Entity}_A$. If any are specified, the SMS 100 undergoes the process described in the section titled "Access Validation: Basic Validation, Extended Validation, Endorsed Extended Validation" (FIG. 4) to further validate $\text{Entity}_B$. If validation fails then $\text{Entity}_B$ is denied access to D, otherwise this process proceeds.

Access to D by $\text{Entity}_B$ is recorded by the SMS 100 on in cloud storage. The SMS 100 will then request a temporary read-only shared access signature for blob $B_A$ from cloud storage. Access information/data, including but not limited to, a URI with a shared access signature ($URI_A$) that will enable $\text{Entity}_B$ to temporarily access $B_A$ is returned to $\text{Entity}_B$. $\text{Entity}_B$ downloads $B_A$ and reads the meta data, MD, associated with $B_A$.

Turning now to FIG. 3B, $\text{Entity}_B$ reads any at rest data protection requirements specified in MD and implements these. For example, M may require that local copies of BA saved by $\text{Entity}_B$ must be saved using encrypted file systems or certain types of file systems.

Attestation from $\text{Entity}_B$ to provide proof that at rest protection requirements have been enforced may be required. The attestation may be endorsed or not, as specified in MD, using the same process of EEV specified above in FIG. 3A. $\text{Entity}_B$ sends any attestation to the SMS 100 to record. The SMS 100 records the attestation in the MD of D on cloud storage.

$\text{Entity}_B$ then requests its protected private key, $SA_{K,IV}(PrK_{BX})$, from the SMS 100, where X is the strength of the public key used to protect the session key used to protect D by $\text{Entity}_A$. X is read from MD, previously saved by A. $\text{Entity}_B$ also requests from the SMS 100 R, S and IV associated with $\text{Entity}_B$.

$\text{Entity}_B$ next generates a decryption key K to decrypt $SA_{K,IV}(PrK_{BX})$ by using a standard key derivation algorithm, such as, but not limited to PBKDF2 or scrypt, with R and S and its shared secret. $\text{Entity}_B$ uses K and IV to decrypt the protected private key $SA_{K,IV}(PrK_{BX})$ to produce $PrK_{BX}$.

$\text{Entity}_B$ uses $PrK_{BX}$ to decrypt $PK_{BX}(K_D)$ to produce $K_D$ which is the protected symmetric key used to encrypt D by $\text{Entity}_A$. $\text{Entity}_B$ uses $K_D$ and the $IV_D$ embedded in MD to decrypt D, using symmetric algorithm SA also embedded in MD. $K_D$, K and $PrK_{BX}$ are then securely deleted.

$\text{Entity}_B$ next consumes or uses D in some fashion. When $\text{Entity}_B$ is finished using D, based on storage restrictions set in MD, $\text{Entity}_B$ may ("offline access) or may not ("online access only") keep a local copy of D. If online-only access is specified, $\text{Entity}_B$ securely destroys all local copy of D, and may or may not provide endorsed or unendorsed attestation of that deletion to the SMS 100. If attestation is provided, the SMS 100 records this attestation in cloud storage.

Access Validation: Basic Validation, Extended Validation and Endorsed Extended Validation FIG. 4 is a flow diagram that illustrates a process for access validation according to one embodiment. FIG. 4 depicts interactions between the SMS 100, the cloud storage system 101, the entity 102b, and the third-party endorser 103. The interactions result in the endorsement by the third-party endorser 103 of a validation claim made by the entity 102b. The validation claim is made by entity 102b to gain access to shared data as described with respect to FIGS. 3A and 3B.

When $\text{Entity}_A$ shares information, D, with $\text{Entity}_B$, $\text{Entity}_A$ may specify access criteria (AC) with which $\text{Entity}_B$ must meet in order to gain access to D. For example, $\text{Entity}_A$ might require that $\text{Entity}_B$ may only access D upon the occurrence of one or more of the following conditions: while located in the United States; at a specified GPS location, or geographical location; within a certain mile radius of a specified latitude and longitude location; only after they have authenticated themselves with the SMS 100 using a password, symmetric key or X.509 certificate; at, from, or via certain IP addresses; on certain computer systems using some system identifier, such as, but not limited to, MAC address, etc.; at certain date and time of day ranges; through genuine non-pirated copies of a given operating system; by providing the numerical one-time-password presented by a software or hardware security token, such as an RSA SecurID token; on a system with anti-malware running and/or up to date; on a operating system that is up to date on patches; on a system that enforces certain password complexity requirements; with a single or series of access criteria met; or the like.

Figure 6B:
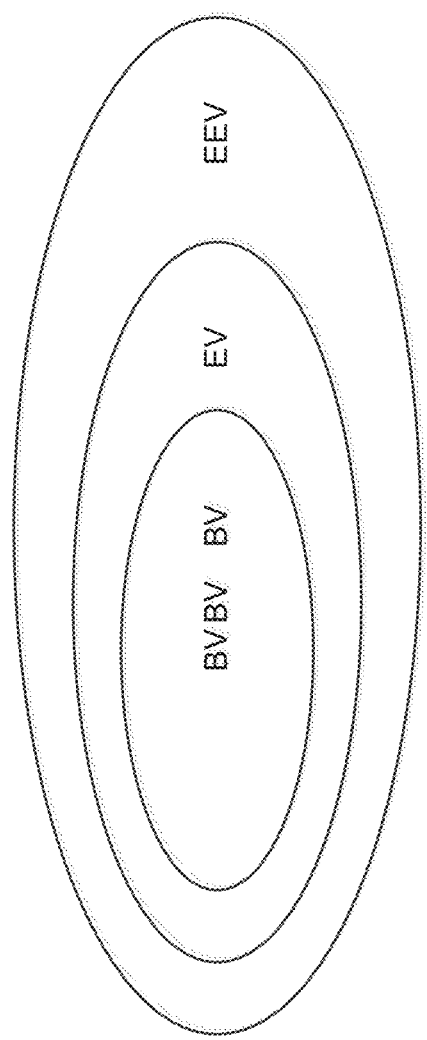
FIG. 6B is a block diagram that illustrates relationships between basic validation, extended validation, and extended endorsed validation.

As illustrated with reference to FIG. 6B, access types can divided into the following three (3) categories:
1. Basic Validation (BV). Validation based on providing the SMS 100 with a shared secret, such as but not limited to a password.
2. Extended Validation (EV). In addition to Basic Validation, the accessing entity must also provide data or a set data to meet data AC.
3. Endorsed Extended Validation (EEV). In addition to Extended Validation, the data or set of data provided by the accessing entity to meet AC is endorsed by a third party that has established a trust-relationship with the SMS 100.

EEV is advantageous because it may be possible for an entity to forge data that would satisfy the AC required to access D. For example, $\text{Entity}_A$ may require that $\text{Entity}_B$, the accessor of D, be within 2 miles of latitude and longitude coordinates (46.854791, 10.469842) in order to access D. An entity could easily lie about their location and gain access to D without being at that actual allowed access location. However, with EEV, the accessor entity would need to "claim" to be presently located at a certain location, and then have a third party that has established a trust relationship with the SMS 100 endorse that claim, typically through digital signing. Then $\text{Entity}_B$ would need to present this endorsed claim to the SMS 100 and access to D would be granted provided all other access criteria was met and the provided claim is valid.

In some embodiments, each validation item (BV, EV, EEV) can have a specific weight assigned to it by the sharing entity. The sharing entity may also set a certain acceptable threshold, whereby if a cumulative weight is met, then access is granted.

One embodiment of EEV may be implemented at least in part using claims-based authentication and security-token-services (STS) (Keith Brown, Exploring Claims-Based Identity, available at: http://msdn.microsoft.com/en-us/magazine/cc163366.aspx). The SMS 100 may implement a STS and any trusted third-party services would implement a similar STS. A prior trust relationship would be established using a shared secret, such as, but not limited to a password, symmetric key or digital certificate. The third party would digitally sign any claims endorsed by that third party using the shared secret, which the SMS 100 upon reception of the endorsed claim from the data accessing entity would validate prior to granting access to D.

As shown in FIG. 4, the EV and EEV process is described as the following. First, a prior trust relationship is established between the SMS 100 and a series of third-party endorsers.

Next, $Entity_B$ requests access to blob $B_A$ shared by $Entity_A$. The SMS 100 retrieves the MD of $B_A$ and inspects the MD for any extended validation access requirements. The SMS 100 responds to $Entity_B$'s request access with an EV and/or EEV challenge, and provides a list of established trusted third-party endorsers ($E_0 \ldots E_N$).

$Entity_B$ gathers data that provides the response to the EV or EEV challenge. For example, the EV or EEV challenge may require $Entity_B$ to provide their current Global Positioning System (GPS) location. For any claims that require EEV, these claims are forwarded by $Entity_B$ to one or more third-party endorsers listed in $E_0 \ldots E_N$.

One or more third-party endorsers validate $Entity_B$'s claims and digitally signs them to create endorsed claims. The endorsed claims are returned to $Entity_B$. $Entity_B$ requests access to $B_A$ shared by $Entity_A$ with EV and/or EEV claims. The SMS 100 validates the EV and/or digitally signed EEV claims and grants or denies further access to $B_A$.

Local Access Modes and Local Storage Restrictions

Any entity that shares data ($Entity_A$) can set requirements as to how the receiving entity or entities ($Entity_B$) may access and locally store D. For example, $Entity_A$ can specify that D may only be accessed online, that is $Entity_B$ is not permitted to store local copies of D. Another example may be that $Entity_B$ is allowed to store D locally, but must do so using an encrypted file system. Upon download of D, $Entity_B$ fulfills the stated access and storage requirements, and may provide attestation to the SMS 100 that those restrictions were followed which the SMS 100 records and keeps for auditing purposes. By recording the attestation, the SMS 100 can later determine, in the event of a breach, whether or not the entity had complied with the requirements or restrictions. Similarly, if online access only is specified, $Entity_B$ must delete all local copies of D and may provide attestation (endorsed or otherwise) to this deletion to the SMS 100 (if required). Attestation may be endorsed by a trusted third-party endorser or not. Such attestations are advantageous because they can be coupled with machine-generated or determined claims in order to implement a security policy with respect to system aspects for which there may be no technology-based enforcement, such as a guarantee that a document will never be shared with another party, that a document will not be transmitted over an insecure network, or the like.

Process for Revoking Access to Shared Data

FIG. 5 is a flow diagram that illustrates a process for shared information revocation according to one embodiment. FIG. 5 depicts interactions between the SMS 100, the cloud storage system 101, and the entities 102*a* and 102*b*. The interactions result in the revocation of access to information shared as described in FIG. 1.

At anytime, $Entity_A$ may revoke $Entity_B$'s access to D. The following describes this revocation process. First, $Entity_A$ validates itself with the SMS 100 using a shared secret, such as, but not limited to a password that is known to $Entity_A$ and the SMS 100.

Then, $Entity_A$ requests the data records, $D_0 \ldots D_N$, of information that it has been shared with $Entity_B$, where N is an integer greater or equal to 0, by $Entity_A$. $Entity_A$ selects $D_X$ among $D_0 \ldots D_N$ to revoke access and sends the request to the SMS 100.

The SMS 100 revokes access to the data ("$B_D$") associated with $D_X$. Revocation may be done by the SMS 100 by deleting $B_D$ entirely from the SMS 100, or by having the SMS 100 set a pre-defined flag in $B_D$'s MD that blocks and overrides all future access attempts to $B_D$ by $Entity_B$.

Although the examples above have been described with respect to data shared via a cloud-based storage system, other storage infrastructures may instead or also be used. For example, these techniques may be employed with respect to a private or intra-organizational storage and/or access system, such as a networked file server, virtual private network, or the like.

In addition, although some examples have been described as using or relying at least in part on passwords to perform various authentication functions, other approaches may also or instead be employed. In particular, other types of shared secrets may be employed, including a symmetric key, a PIN, a one-time token, a limited-use token, or the like. Also, authentication techniques that do not rely on shared secrets may be used in some circumstances, such as by employing public/private key pair techniques.

Example Processes

FIGS. 7.1-7.9 are flow diagrams that illustrate processes for securing access to stored data according to one embodiment. The illustrated logic in the flow diagrams may be performed by the SMS 100 described herein. In some embodiments, some of the functions may be distributed, in that they may be performed at least in part by a client system, a storage system used by the SMS 100, or some other component.

FIG. 7.1 is an example flow diagram of example logic for securing access to stored data. In some embodiments, this process is performed by or at the SMS 100. In other embodiments, one or more of the described operations may be performed by other components, such as a client system. More particularly, FIG. 7.1 illustrates a process 7100 that includes operations performed by or at the following block(s).

At block 7101, the process performs restricting, by a storage management computing system, access to stored data to entities having associated access claims that are endorsed by a trusted third party, by: performing operation(s) of block(s) 7102, 7103, 7104, 7105 and 7106, described below. The process allows or denies access based on endorsements provided by trusted third parties. An endorsement validates an access claim, such as a claim that a particular access property or criterion is met, such as properties related to the identity, location, or residence of the party seeking to access the stored data.

At block 7102, the process performs receiving from a first entity an indication of stored data to be shared. The process typically receives the indication from a computing system or device operated by the first entity. In some embodiments, the data may be stored on a cloud-based storage system that may or may not be administered or operated by the SMS or the system that is performing the illustrated process. In other cases, the data may be stored on a non-cloud-based system, such as a networked storage system operated for and accessible by users associated with a single organizational entity (e.g., a company, an agency).

At block 7103, the process performs receiving from the first entity multiple access criteria for validating an access to the stored data. Various types of access criteria or conditions are contemplated, including traditional identity or password-based criteria, location-based criteria, time-of-day criteria, system configuration criteria (e.g., hardware or software configuration), and the like.

At block 7104, the process performs receiving from a second entity a request to access the stored data. The process typically receives the request from a computing system or device operated by the second entity. In response, the process will typically transmit to the second entity indications of the multiple access criteria.

At block 7105, the process performs receiving from the second entity data items corresponding to each of the multiple access criteria. The second entity provides to the process data items corresponding to the criteria or conditions, such as user names, passwords, location indicators, time indicators, system information, or the like. These data items may be represented as (or referred to) as "claims" that are made by the second entity.

At block 7106, the process performs transmitting the stored data to the second entity only when the data item corresponding to at least one of the multiple access criteria is validated based on an endorsement received from a trusted third party. The process will transmit (or otherwise allow access to) the stored data only in response to endorsement by the trusted third party of at least one of the claims made by the second entity. In some cases, the process will use a scoring system, in which endorsed claims are given higher scores, thereby yielding higher aggregate scores when some of the claims are endorsed. If the endorsement is not valid or is otherwise not present, the process will take actions to restrict access, such as by denying the request for access, transmitting a message, logging the request as unauthorized, or the like.

FIG. 7.2 is an example flow diagram of example logic illustrating an example embodiment of process 7100 of FIG. 7.1. More particularly, FIG. 7.2 illustrates a process 7200 that includes the process 7100, and which further includes operations performed by or at the following block(s).

At block 7201, the process performs receiving the endorsement from the trusted third party, the endorsement verifying that the data item satisfies the corresponding criterion. In some embodiments, the process may transmit the access criteria to the third party along with the corresponding data items, so that the third party can endorse the claims made by the second entity. The verification may be based on techniques such as shared secrets and/or digital signatures. For example, and endorsement may be signed using a private key of the third party, thereby proving that the endorsement is authentic.

FIG. 7.3 is an example flow diagram of example logic illustrating an example embodiment of process 7100 of FIG. 7.1. More particularly, FIG. 7.3 illustrates a process 7300 that includes the process 7100, and which further includes operations performed by or at the following block(s).

At block 7301, the process performs causing the second entity to obtain the endorsement from the trusted third party, by: performing operation(s) of block(s) 7302 and 7303, described below. In some embodiments, the process causes the second entity to obtain the endorsement.

At block 7302, the process performs transmitting to the second entity the multiple access criteria along with an indication of the trusted third party. The process may inform the second entity of one or more trusted third parties that can provide endorsements. After receiving the access criteria and the indication of the trusted third party, the second entity interacts with the third party to obtain an endorsement. Then, the second entity transmits the endorsement to the illustrated process for validation.

At block 7303, the process performs receiving from the second entity an indication that one of the data items has been endorsed by the trusted third party. Once the process receives the endorsement, the process may validate the endorsement, such as by checking a digital signature (e.g., applied or generated by the trusted third party), or the like. In other embodiments, the trusted third party may be responsible for providing the endorsement to the process, rather than passing it via the second entity.

FIG. 7.4 is an example flow diagram of example logic illustrating an example embodiment of process 7100 of FIG. 7.1. More particularly, FIG. 7.4 illustrates a process 7400 that includes the process 7100, wherein the multiple access criteria include associated weights, and which further includes operations performed by or at the following block(s).

At block 7401, the process performs determining a score based on an aggregation of the weights applied to indications of whether each of the multiple access criteria have been met by the second entity, wherein a first one of the multiple access criteria requires the second entity to make an attestation regarding compliance with a local storage requirement, the first multiple access criteria not requiring an endorsement from the trusted third party, wherein a second one of the multiple access criteria requires an endorsement from the trusted third party. As noted, endorsed claims may be given higher scores. Scores for endorsements may also or instead be based on the "quality" of the endorsements provided by the third party. For example, endorsements received from a third party that is known to provide highly accurate location information (e.g., latitude/longitude information within a small margin of error) may be given a higher score than endorsements received from a coarse grained location (e.g., city and/or state-level) provider. In addition, in some cases, different kinds of criteria may be mixed. For example, a first criterion may require that the user attest to a particular property or requirement regarding how the data will be stored on his local system, where this first criterion is not validated or endorsed by a trusted third party, while a second criterion may be a location-based criterion that is endorsed by the trusted third party.

At block 7402, the process performs transmitting the stored data only when the determined score is higher than or equal to a specified threshold. The threshold may be established by the first (sharing) entity and/or by the SMS 100.

FIG. 7.5 is an example flow diagram of example logic illustrating an example embodiment of process 7100 of FIG. 7.1. More particularly, FIG. 7.5 illustrates a process 7500 that includes the process 7100, wherein the receiving from the first entity multiple access criteria includes operations performed by or at one or more of the following block(s).

At block 7501, the process performs receiving an access criterion that requires an entity to be or reside at a specified location. Location-based criteria may represent locations in various ways, such as by city, state, country, postal code, or the like. In other cases, a location may be a GPS coordinate along with a radius. Some embodiments may also consider the motion of the entity, such as by limiting access to those entities that are at rest or are moving slower than a specified rate.

FIG. 7.6 is an example flow diagram of example logic illustrating an example embodiment of process 7100 of FIG. 7.1. More particularly, FIG. 7.6 illustrates a process 7600 that includes the process 7100, wherein the receiving from the first entity multiple access criteria includes operations performed by or at one or more of the following block(s).

At block 7601, the process performs receiving an access criterion that requires an entity to authenticate themselves using a password, symmetric key, X.509 certificate, and/or a one-time password provided by a hardware or software token generator.

FIG. 7.7 is an example flow diagram of example logic illustrating an example embodiment of process 7100 of FIG. 7.1. More particularly, FIG. 7.7 illustrates a process 7700 that includes the process 7100, wherein the receiving from the first entity multiple access criteria includes operations performed by or at one or more of the following block(s).

At block 7701, the process performs receiving an access criterion that requires an entity to be accessing the stored data from a computer having specified system properties. Various hardware and/or software system properties are contemplated, including network identifiers (e.g., IP address, MAC address), hardware identifiers (e.g., disk ID, MAC address), software identifiers (e.g., name, signature, version), and the like.

FIG. 7.8 is an example flow diagram of example logic illustrating an example embodiment of process 7100 of FIG. 7.1. More particularly, FIG. 7.8 illustrates a process 7800 that includes the process 7100, wherein the transmitting the stored data to the second entity only when the data item corresponding to at least one of the multiple access criteria is validated includes transmitting the stored data only when the trusted third party verifies that the second entity is accessing the stored data from a computer associated with an organization that is certified as complying with one or more of a security standard, a privacy regulation, or a quality standard. For example, the process may transmit the stored data only when the trusted third party verifies that the second entity's computer is associated with a company that complies with HIPAA, Sarbanes Oxley, Gramm-Leach-Bliley, ISO Security-related standards, or the like.

FIG. 7.9 is an example flow diagram of example logic illustrating an example embodiment of process 7100 of FIG. 7.1. More particularly, FIG. 7.9 illustrates a process 7900 that includes the process 7100, and which further includes operations performed by or at the following block(s).

At block 7901, the process performs establishing a trusted relationship with the trusted third party by sharing a secret with the trusted third party. In some embodiments, the process first establishes trusted relationships with one or more third parties, such as by use of a shared secret (e.g., a random number or other token). In other cases, the determination of trust may be performed on demand, such as at the time when an endorsement is validated.

At block 7902, the process performs receiving from the second entity an indication that one of the data items has been endorsed by the trusted third party, the indication including a digital signature generated by the trusted third party using the shared secret. For example, the indication that a data item has been endorsed may be a message or other data structure that includes the data item and an indication of the second entity, where the message (or a message digest) is encrypted using the shared secret.

At block 7903, the process performs validating the digital signature generated by the trusted third party.

Example Computing System Implementation

Figure 8:
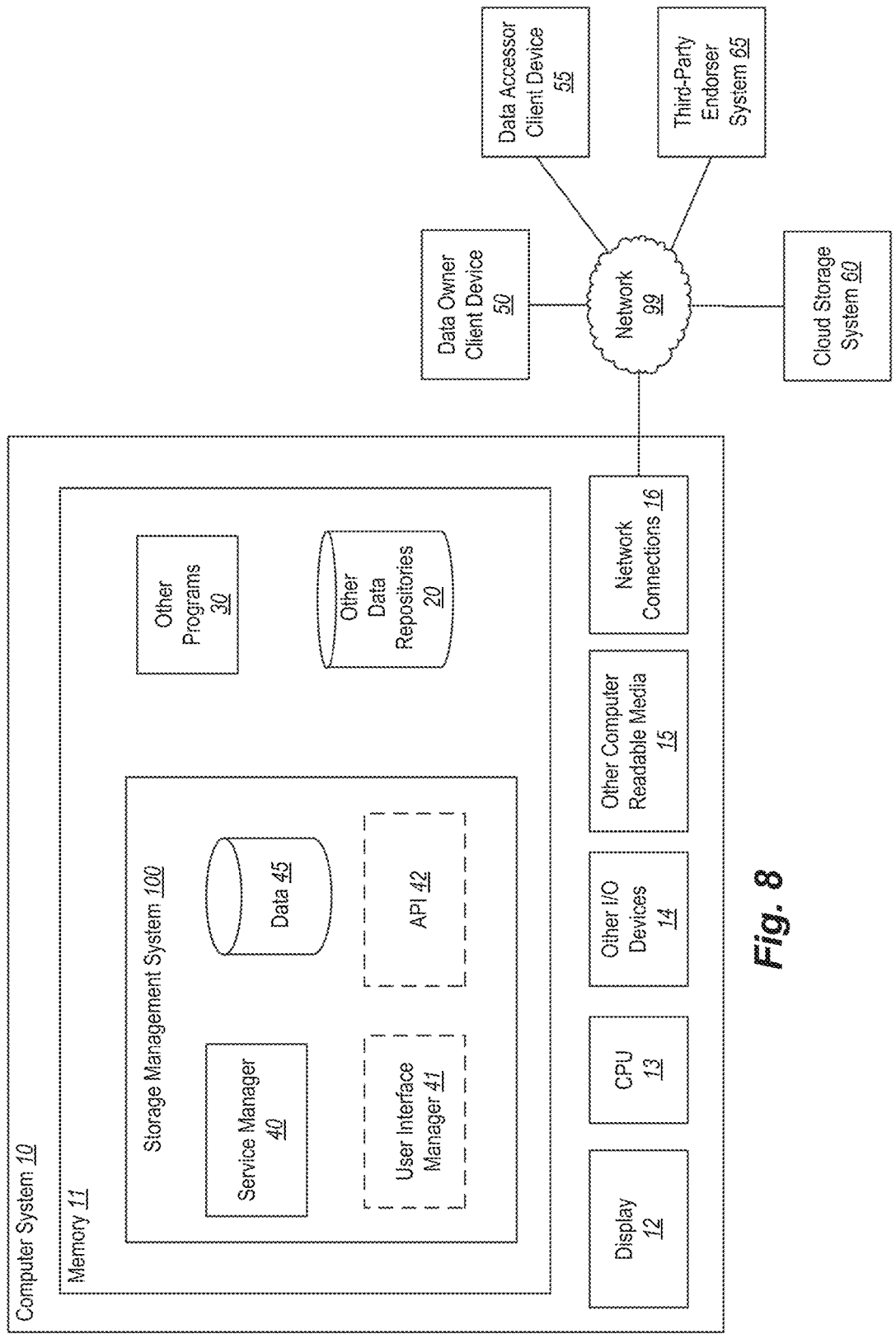
FIG. 8 is a block diagram of a computing system for practicing embodiments of a storage management system.

FIG. 8 is an example block diagram of an example computing system for implementing a Storage Management System according to an example embodiment. In particular, FIG. 8 shows a computing system 10 that may be utilized to implement an SMS 100. Also, at least some of the implementation techniques described below with respect to the SMS 100 may be used to implement other devices, systems, or modules described herein, including the client devices 50 and 55, or other computing systems.

Note that one or more general purpose or special purpose computing systems/devices may be used to implement the SMS 100. In addition, the computing system 10 may comprise one or more distinct computing systems/devices and may span distributed locations. Furthermore, each block shown may represent one or more such blocks as appropriate to a specific embodiment or may be combined with other blocks. Also, the SMS 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The SMS 100 is shown residing in memory 11. In other embodiments, some portion of the contents, some or all of the components of the SMS 100 may be stored on and/or transmitted over the other computer-readable media 15. The components of the SMS 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 8 may not be present in any specific implementation. For example, some embodiments may not provide other computer readable media 15 or a display 12.

The SMS 100 interacts via the network 99 with a data owner client device 50, a data accessor client device 55, a cloud-based storage system 60, and a third-party endorser system 65. The devices 50 and 55 are respectively used by the entities 102a and 102b described above, and may be any computing systems or devices that are configured to interact via the network 99 with the SMS 100 or other remote hosts or systems. For example, the devices 50 and 55 may include smart phones, laptop computers, desktop computers, embedded computing devices, and the like. The systems 60 and 65 respectively host the cloud-based storage 101 and the trusted third-party endorser 103 described above. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

The SMS 100 is shown executing in the memory 11 of the computing system 10. The SMS 100 includes a service manager 40, a user interface manager 41, an application program interface ("API") 42, and a data store 45. The user interface manager 41 and the API 42 are drawn in dashed lines to indicate that in other embodiments, functions performed by one or more of these components may be performed externally to the SMS 100.

The service manager 41 implements the core logic of the SMS 100. For example, the service manager 41 processes requests to share data, access data, revoke access rights, validate endorsements, established trusted relationships with endorsers, and the like.

The UI manager 41 provides a view and a controller that facilitate user interaction with the SMS 100 and its various components. For example, the UI manager 41 may provide interactive access to the SMS 100, such that users can interact with the SMS 100, such as by providing data, requesting that particular data be shared with a specified user, accessing shared data, and the like. In some embodiments, access to the functionality of the UI manager 41 may be provided via a Web server, possibly executing as one of the other programs 30. In such embodiments, a user operating a Web browser executing on one of the client devices 50 or 55 can interact with the SMS 100 via the UI manager 41.

The API 42 provides programmatic access to one or more functions of the SMS 100. For example, the API 42 may provide a programmatic interface to one or more functions of the SMS 100 that may be invoked by one of the other programs 30 or some other module. In this manner, the API 42 facilitates the development of third-party software, such as user interfaces, plug-ins, adapters (e.g., for integrating functions of the SMS 100 into Web applications), and the like.

In addition, the API 42 may be in at least some embodiments invoked or otherwise accessed via remote entities, such as code executing on one of the client devices 50 or 55, cloud storage system 60, and/or third-party endorser system 65, in order to access various functions of the SMS 100. For example, the data accessor client device 55 may transmit an endorsement received from the endorser system 65 to the SMS 100 via the API 42. The API 42 may also be configured to provide management widgets (e.g., code modules) that can be integrated into the third-party applications 55 and that are configured to interact with the SMS 100 to make at least some of the described functionality available within the context of other applications (e.g., mobile apps).

In an example embodiment, components/modules of the SMS 100 are implemented using standard programming techniques. For example, the SMS 100 may be implemented as a "native" executable running on the CPU 13, along with one or more static or dynamic libraries. In other embodiments, the SMS 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the SMS 100, such as in the data store 45, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 45 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the SMS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. patent application Ser. No. 13/904,401, entitled "Systems and Methods for Validated Secure Data Access," filed May 23, 2013, and U.S. Provisional Application No. 61/651,188, filed on May 24, 2012 and entitled "Systems and Methods for Validated Secure Data Access," is incorporated herein by reference, in their entireties.

From the foregoing it will be appreciated that, although specific embodiments have been described herein for purposes of illustration, various modifications may be made without deviating from the spirit and scope of the invention. Also, the methods and systems discussed herein are applicable to differing protocols, communication media (e.g., optical, wireless, cable, etc.) and devices (e.g., wireless handsets, electronic organizers, personal digital assistants, portable email machines, game machines, pagers, navigation devices such as GPS receivers, etc.).

The invention claimed is:

1. A method for securing access to shared data stored in a storage system, the method comprising:
restricting, by a storage management computing system, access to the shared data to entities having associated access claims that are endorsed by a trusted third party, by:
receiving from a first entity an indication of stored data to be shared;
receiving from the first entity multiple access requirements for validating an access to the stored data;
receiving from a second entity a request to access the shared data;
reading access requirements associated with the requested shared data from the storage system, wherein the access requirements include access criteria having associated weights;
sending to the second entity a challenge with the access requirements and an indication of a trusted third-party endorser, thereby causing the second entity to request an endorsement from the trusted third-party endorser based on the challenge, wherein the request comprises entity-specific data based on the access requirements;
receiving from the second entity the entity-specific data and a digitally signed endorsed claim provided to the entity by the trusted third-party endorser, the digitally signed endorsed claim verifying that the entity-specific data satisfies a corresponding access requirement;
validating the digitally signed endorsed claim received from the second entity in response to the challenge;
determining a score based on an aggregation of the weights applied to indications of whether each of the access criteria have been met by the second entity, wherein a first one of the access criteria requires the second entity to make an attestation regarding compliance with a local storage requirement, the first access criteria not requiring an endorsement from the trusted third-party endorser, wherein a second one of the access criteria requires an endorsement from the trusted third party-endorser;
when validation succeeds, requesting a temporary shared access uniform resource identifier to the shared data, and transmitting the uniform resource identifier to the second entity only when the determined score is higher than or equal to a specified threshold; and
transmitting the shared data to the second entity only during a time period associated with the temporary shared access uniform resource identifier.

2. The method of claim 1, wherein the shared data is stored on a cloud-based storage system, wherein requesting the temporary shared access uniform resource identifier includes requesting the temporary shared access uniform resource identifier from the cloud-based storage system, and wherein the temporary shared access uniform resource identifier provides the second entity with time-bound access to the shared data.

3. The method of claim 1, wherein the stored data is stored on a non-cloud-based storage system, wherein access to the storage system is limited to users associated with a single organizational entity.

4. The method of claim 1, further comprising: receiving an indication that the entity-specific data does not satisfy one of the access requirements.

5. The method of claim 1, wherein one of the access requirements requires an entity to be or reside at a specified location, wherein the location includes at least one of: a city, a state, a country, a GPS location, and/or a region specified by a GPS location and a radius.

6. The method of claim 5, wherein the uniform resource identifier is transmitted only when the trusted third-party endorser verifies that the second entity is at the specified location.

7. The method of claim 5, wherein the uniform resource identifier is transmitted only when the trusted third-party endorser verifies that the second entity is accessing the stored data from a mobile device that is at rest or is moving at less than a predefined limit rate.

8. The method of claim 1, wherein one of the access requirements requires an entity to be accessing the stored data from a computer having system properties that include at least one of: a network identifier, presence of a specified security software module/configuration, presence of a specified non-pirated software module, presence of a specified security patch, connection to a specified private network, and/or presence of a specified version of a software module or operating system.

9. The method of claim 1, wherein the uniform resource identifier is transmitted only when the trusted third-party endorser verifies that the second entity is accessing the stored data from a computer associated with an organization that is certified as complying with one or more of a security standard, a privacy regulation, or a quality standard.

10. The method of claim 1, wherein the trusted third-party endorser is a voice/data service provider configured to verify a location of a mobile device used by the second entity.

11. The method of claim 1, further comprising:
establishing a trusted relationship with the trusted third-party endorser by sharing a secret with the trusted third-party endorser;
receiving from the second entity an indication that entity-specific data has been endorsed by the trusted third-party endorser, the indication including a digital signature generated by the trusted third-party endorser using the shared secret; and
validating the digital signature generated by the trusted third-party endorser.

12. The method of claim 1, wherein at least one of the multiple access requirements requires an entity to make an attestation regarding compliance with a local storage requirement, and wherein the at least one access criteria does not require an endorsement from the trusted third-party endorser.

13. The method of claim 1, wherein at least one of the multiple access requirements requires an endorsement from the trusted third-party endorser.

14. A non-transitory computer-readable medium including contents that are configured, when executed, to cause a computing system to perform a method for securing access to shared data stored in a storage system, the method comprising:

by a storage management computing system:
establishing a trust relationship with a third-party endorser;
receiving from an entity a request to access the shared data;
reading access requirements associated with the requested shared data from a remote storage system, wherein the access requirements include access criteria having associated weights;
sending to the entity a challenge with the access requirements and an indication of the trusted third-party endorser, thereby causing the entity to request an endorsement from the trusted third-party endorser based on the challenge, wherein the request comprises entity-specific data based on the access requirements;
receiving the entity-specific data and a digitally signed endorsed claim provided by the trusted third-party endorser, the digitally signed endorsed claim verifying that the entity-specific data satisfies a corresponding access requirement;
determining a scored based on an aggregation of the weights applied to indications of whether each of the access criteria have been met by the entity, wherein a first one of the access criteria requires the entity to make an attestation regarding compliance with a local storage requirement, the first access criteria not requiring an endorsement from the trusted third-party endorser, wherein a second one of the access criteria requires an endorsement from the trusted third-party endorser; and
upon validating the digitally signed endorsed claim, requesting a temporary shared access uniform resource identifier to the shared data, and transmitting the uniform resource identifier to the entity only when the determined score is higher than or equal to a specified threshold.

15. The non-transitory computer-readable medium of claim 14, wherein the method further comprises: transmitting the shared data only during a time period associated with the temporary access uniform resource identifier.

16. A system for securing access to shared data, the system comprising:
an entity computing system;
a cloud storage computing system that stores the shared data; and
a storage management computing system having a processor and a memory that includes instructions that are configured, when executed by the processor, to perform a method comprising:
establishing a trust relationship with a third-party endorser;
receiving from the entity computing system a request to access the shared data stored on the cloud storage computing system;
reading access requirements associated with the requested shared data from the cloud storage computing system, wherein the access requirements include access criteria having associated weights;
sending to the entity computing system a challenge with the access requirements and an indication of a trusted third-party endorser, thereby causing the entity computing system to request an endorsement from the trusted third-party endorser based on the challenge, wherein the request comprises entity-specific data based on the access requirements;
receiving from the entity computing system the entity-specific data and a digitally signed endorsed claim provided by the trusted third-party endorser, the digitally signed endorsed claim verifying that the entity-specific data satisfies a corresponding access requirement;
determining a score based on an aggregation of the weights applied to indications of whether each of the access criteria have been met by the entity, wherein a first one of the access criteria requires the entity to make an attestation regarding compliance with a local storage requirement, the first access criteria not requiring an endorsement from the trusted third-party endorser, wherein a second one of the access criteria requires an endorsement from the trusted third-party endorser; and
upon validating the digitally signed endorsed claim, transmitting to the entity computing system a temporary shared access uniform resource identifier only when the determined score is higher than or equal to a specified threshold, wherein the shared access uniform resource identifier grants time-bound access to the shared data stored by the cloud storage computing system.

17. The system of claim 16, wherein the entity computing system is configured to:
receive the challenge, access requirements, and an indication of a trusted third-party endorser from the storage management computing system;
in response to the received challenge, request the endorsement from the trusted third-party endorser based on the challenge, wherein the request comprises entity-specific data based on the access requirements;
transmit the endorsement to the storage management computing system; and
receive the temporary shared access uniform resource identifier, wherein the temporary shared access uniform resource identifier provides the entity computing system with time-bound access to the shared data.

18. The system of claim 16, wherein the trusted third-party endorser is a social networking service configured to verify identity information, location, and/or residence claims made by the entity computing system.

19. The system of claim 16, wherein the trusted third-party endorser is a government agency configured to verify identity information and/or residence claims made by the entity computing system.

* * * * *